United States Patent
Wang et al.

(10) Patent No.: US 10,861,148 B2
(45) Date of Patent: Dec. 8, 2020

(54) SYSTEMS AND METHODS FOR IMPROVED COMPONENT INSPECTION

(71) Applicant: General Electric Company, Schenectady, NY (US)

(72) Inventors: Wei Wang, Niskayuna, NY (US); Longyin Wen, Niskayuna, NY (US); Xiao Bian, Niskayuna, NY (US); Arpit Jain, Niskayuna, NY (US); David Scott Diwinsky, West Chester, OH (US); Bernard Patrick Bewlay, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 169 days.

(21) Appl. No.: 15/966,859

(22) Filed: Apr. 30, 2018

(65) Prior Publication Data
US 2019/0333202 A1    Oct. 31, 2019

(51) Int. Cl.
| G06T 7/00 | (2017.01) |
| G06T 5/00 | (2006.01) |
| G06T 5/20 | (2006.01) |
| B64F 5/60 | (2017.01) |

(52) U.S. Cl.
CPC .............. *G06T 7/001* (2013.01); *G06T 5/002* (2013.01); *G06T 5/20* (2013.01); *B64F 5/60* (2017.01); *G06T 2207/30168* (2013.01)

(58) Field of Classification Search
CPC . B64F 5/60; G06T 2207/30168; G06T 5/002; G06T 5/20; G06T 7/001
USPC .................................. 348/125, 82; 356/241
See application file for complete search history.

(56) References Cited

U.S. PATENT DOCUMENTS

| 7,489,811 B2 | 2/2009 | Brummel et al. |
| 7,499,584 B2 | 3/2009 | Delaney |
| 7,619,728 B2 | 11/2009 | Ogburn et al. |
| 8,090,212 B1 * | 1/2012 | Baxansky ............... H03F 3/217 |
| | | 382/260 |

(Continued)

FOREIGN PATENT DOCUMENTS

| CN | 107657603 A | 2/2018 |
| JP | 2016035670 A * | 3/2016 |

OTHER PUBLICATIONS

Lu, "Image Analysis for Video Artifact Estimation and Measurement", Proceedings SPIE 4301, Machine Vision Applications in Industrial Inspection IX, San Jose, CA, Apr. 4, 2001. (10 pages).

(Continued)

*Primary Examiner* — Christopher S Kelley
*Assistant Examiner* — Kathleen M Walsh
(74) *Attorney, Agent, or Firm* — Joseph F. Harding; The Small Patent Law Group LLC

(57) ABSTRACT

A system includes a borescope and at least one processor. The borescope includes a camera configured to acquire an acquisition series of frames of at least one target component. The at least one processor is operably coupled to the camera, and is configured to acquire the acquisition series of frames from the camera; determine a blurriness metric value for each of the frames; select frames that satisfy a threshold for the blurriness metric value to form an inspection series of frames; and perform an inspection analysis for the at least one target component using the inspection series of frames.

20 Claims, 3 Drawing Sheets

(56) References Cited

U.S. PATENT DOCUMENTS

| | | | |
|---|---|---|---|
| 8,515,711 B2* | 8/2013 | Mitchell | F01D 21/003 |
| | | | 702/183 |
| 8,744,166 B2 | 6/2014 | Scheid et al. | |
| 8,861,884 B1* | 10/2014 | Fang | G06K 9/6256 |
| | | | 382/255 |
| 8,976,242 B2 | 3/2015 | Aikawa et al. | |
| 9,137,440 B2 | 9/2015 | Choi | |
| 2006/0078193 A1* | 4/2006 | Brummel | G01N 21/8806 |
| | | | 382/152 |
| 2010/0172549 A1* | 7/2010 | Weiss | G06T 7/0002 |
| | | | 382/118 |
| 2013/0211659 A1* | 8/2013 | Peynot | G06K 9/00805 |
| | | | 701/28 |
| 2013/0315556 A1* | 11/2013 | Ju | H04N 5/23264 |
| | | | 386/224 |
| 2014/0132784 A1* | 5/2014 | Chouly | G06T 7/20 |
| | | | 348/208.1 |
| 2014/0267693 A1* | 9/2014 | Newman | F03D 17/00 |
| | | | 348/128 |
| 2014/0362256 A1* | 12/2014 | Schulze | H04N 5/23277 |
| | | | 348/231.99 |
| 2015/0193947 A1* | 7/2015 | Sharma | G06T 7/0004 |
| | | | 382/264 |
| 2016/0098822 A1* | 4/2016 | Nicolas | G06T 5/002 |
| | | | 382/275 |
| 2016/0125249 A1* | 5/2016 | Mei | G06K 9/00805 |
| | | | 382/103 |
| 2016/0217587 A1* | 7/2016 | Hay | G06F 16/7335 |
| 2018/0005362 A1* | 1/2018 | Wang | G06T 7/001 |
| 2018/0035058 A1* | 2/2018 | Thumpudi | G06T 7/90 |
| 2018/0210189 A1* | 7/2018 | Ramsbottom | H04N 7/183 |

OTHER PUBLICATIONS

Crété-Roffett et al, "The Blur Effect: Perception and Estimation with a New No-Reference Perceptual Blur Metric", SPIE Electronic Imaging Symposium Conf Human Vision and Electronic Imaging, Jan. 2007, San Jose, United States. XII, pp.El 6492-16, 2007. (12 pages).

* cited by examiner

SYSTEMS AND METHODS FOR IMPROVED COMPONENT INSPECTION

FIELD

Embodiments of the subject matter described herein relate to component inspection, for example to inspection of one or moving components of a system.

BACKGROUND

Inspection of components using acquired images of the components may be complicated by a number of issues. For example, light, reflection, or other considerations may affect the data or image quality. As another example, pose, focus, vibrations, and movement of the component may affect image or data quality when acquiring images of a moving component. As a result, images of the component may become blurred. When the blurring becomes severe enough, the performance of an inspection based on the images may be compromised.

BRIEF DESCRIPTION

In an embodiment, a system includes a borescope and at least one processor. The borescope includes a camera configured to acquire an acquisition series of frames of at least one target component. The at least one processor is operably coupled to the camera, and is configured to acquire the acquisition series of frames from the camera; determine a blurriness metric value for each of the frames; select frames that satisfy a threshold for the blurriness metric value to form an inspection series of frames; and perform an inspection analysis for the at least one target component using the inspection series of frames.

In an embodiment, a method includes acquiring, with a borescope including a camera, an acquisition series of frames of at least one target component. The method also includes determining, with at least one processor, a blurriness metric value for each of the frames. Further, the method includes selecting frames that satisfy a threshold for the blurriness metric value to form an inspection series of frames. Also, the method includes performing an inspection analysis for the at least one target component using the inspection series of frames.

In another embodiment, a tangible and non-transitory computer readable medium includes one or more computer software modules. The one or more computer software modules are configured to direct one or more processors to acquire, with a borescope including a camera, an acquisition series of frames of at least one target component; determine a blurriness metric value for each of the frames; select frames that satisfy a threshold for the blurriness metric value to form an inspection series of frames; and perform an inspection analysis for the at least one target component using the inspection series of frames.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
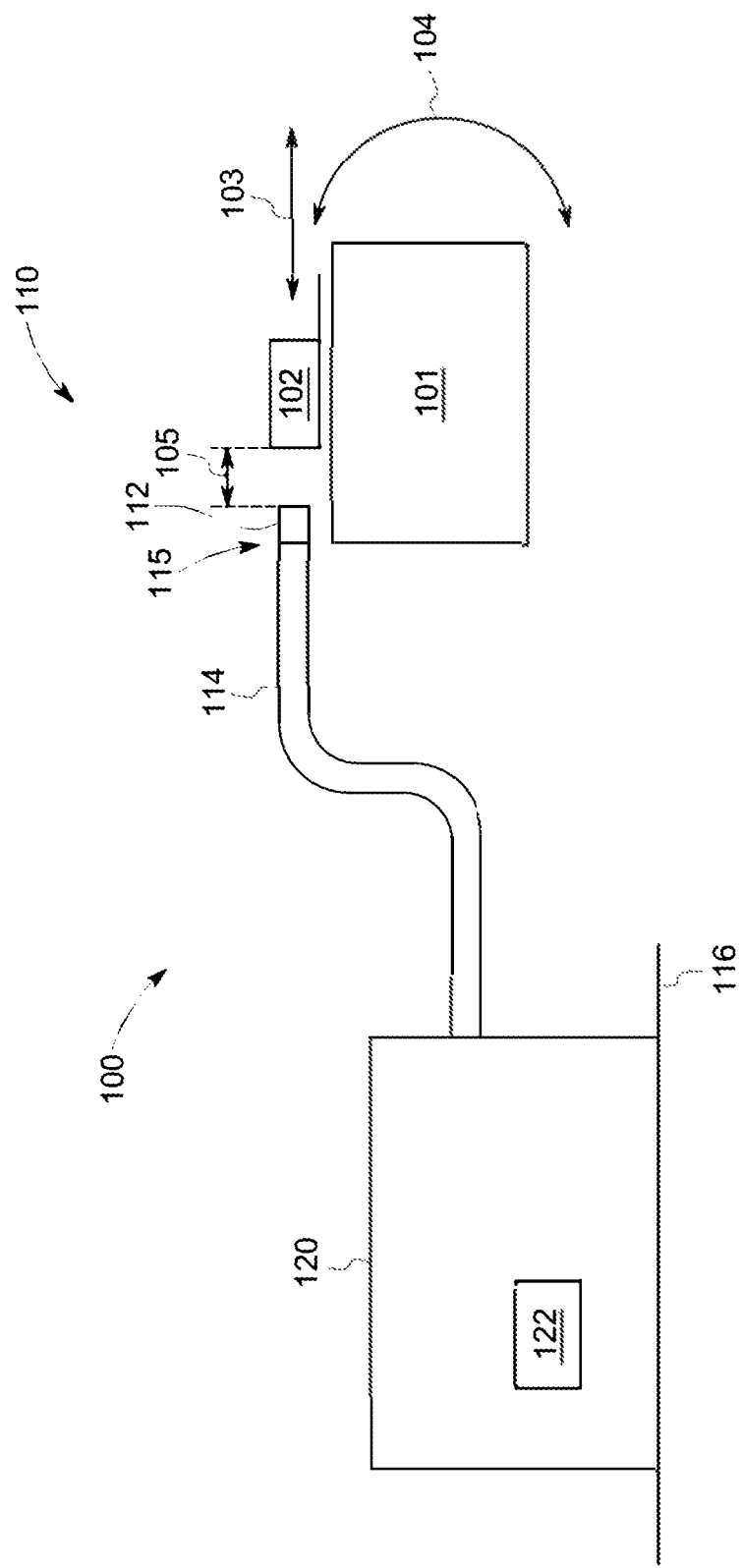
FIG. 1 is a schematic block view of a system according to an embodiment.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system" or "device" may include a hardware and/or software system that operates to perform one or more functions. For example, a unit, device, or system may include a computer processor, controller, or other logic-based device that performs operations based on instructions stored on a tangible and non-transitory computer readable storage medium, such as a computer memory. Alternatively, a unit, device, or system may include a hard-wired device that performs operations based on hard-wired logic of the device. The units, devices, or systems shown in the attached figures may represent the hardware that operates based on software or hardwired instructions, the software that directs hardware to perform the operations, or a combination thereof. The systems, devices, or units can include or represent hardware circuits or circuitry that include and/or are connected with one or more processors, such as one or computer microprocessors.

One or more embodiments of the inventive subject matter described herein provide systems and methods for improved inspection of moving parts (e.g., by identifying and removing images adversely affected by blurring). Various embodiments quantitatively determine the quality of images (e.g., in an on-line and real-time fashion) to identify blurriness, providing for improved performance of subsequent image analytics.

Various embodiments employ a borescope to acquire imaging information of moving components that are installed and functioning for their designed purpose, such as rotating blades of an aircraft engine. For example, use of a borescope to perform an on-wing inspection can greatly reduce inspection cost and associated human labor. Further, computer vision-based inspection helps make a defect evaluation procedure more standardized and quantitatively controllable. Generally, data quality is important for computer vision techniques to enable inspection algorithms to function appropriately. Accordingly, various embodiments help identify blurring in image frames to facilitate efficient and effective inspection. Various embodiments disclosed herein detect blurriness with good robustness to discriminate video frames of poor quality (e.g., blurriness exceeding a tolerable or desired level).

Various approaches are used in different embodiments. For example, in some embodiments, a baseline approach is employed, which provides a quantitative value to describe the degree of blurriness in an image or frame in a video, but does not localize a particular place of blurriness. Instead, the baseline approach provides a comprehensive value for the quality of the image. As an example of such an approach, in some embodiments, a filter is applied to an image to provide a corresponding blurred image. Then, the variance of the gradient of the image and the blurred image are computed. As the filter blurs the image, if the original image is of high quality (low blurring), then the filtered or blurred image will have a large difference, and the resulting variance value of the gradients will be quite different. On the other hand, if the original image is of low quality (high blurring), the variance of the gradients will be more similar.

Another approach utilized in various embodiments may be based on deep learning. For example, a trained deep neural network model may give a probability value of each pixel in an image belonging to different categories of blurriness. Accordingly, not only may sub-regions in the image that are blurry be localized, but also the type of blurriness may be identified (e.g., for possible adoption of de-blurring and/or for weighting in determining a blurriness metric). Such a deep model may be trained using reference images with different kinds of blurriness. Available segmentation datasets may be utilized with masks of different object in images. Further, blurry images may be synthesized by applying different blurring kernels onto different object regions in a dataset, generating a large dataset with images degraded by different types and/or levels of blurriness. The trained model may recognize the blurriness at each pixel in an image. The evaluation of an entire image may then be derived by summing the blurriness probability of each pixel. Normalization may be applied so that an evaluation value of a blurriness metric is a value between 0 and 1.

Various embodiments provide a quantitative blur metric value to help identify blurred images. As blurring in images may cause an analytic algorithm to provide false positives and/or false negatives, identifying and removing blurred images improves the performance of visual inspection analytic algorithms. Accordingly, data of low quality may be skipped, reducing the cost and/or improving the efficiency and/or accuracy of automatic inspection techniques.

The various embodiments are described in more detail herein with reference to the accompanying figures.

FIG. 1 provides a schematic block view of a system 100. The system 100 is configured for inspection (e.g., automatic or autonomous inspection) of at least one target component. For example, in the example depicted in FIG. 1, a system 101 includes a moving component 102. In the illustrated embodiment, the system 100 is configured to inspect one or more aspects of system 101, such as the moving component 102 (a moving component to be inspected may also be referred to herein as a moving target component). The moving component 102, for example, may translate laterally along direction 103, or, as another example, rotate in rotational direction 104. Only one moving component 102 is depicted in FIG. 1 for ease and clarity of illustration; however, it may be noted that more than one moving component 102 may be inspected by system 100 in various embodiments. Further, it may be noted that, while the component 102 is discussed as being a moving component in connection with various examples discussed herein, in some embodiments the component 102 need not necessarily translate laterally, rotate, or otherwise have a net movement with respect to a camera. For example, the component 102 may be generally stationary but subject to imaging blurriness due to vibration.

The depicted system 100 includes a borescope 110 and a processing unit 120. Generally, the borescope 110 is configured to acquire images of the moving component 102, and the processing unit 120 is configured to perform an inspection of the moving component 102 using the images acquired by the borescope 110.

The borescope 110 of the illustrated example includes a camera 112 and a flexible member 114. The camera 112 is positioned at a distal end 115 of the flexible member 114. To position the camera 112 at a desired position, the borescope 110 is positioned at a mounting location 116. In the illustrated embodiment, the processing unit 120 is depicted as being formed as a base or as a part of a base for mounting the borescope 110; however, the processing unit 120 may be located remotely from the mounting location 116 in other embodiments. The flexible member 114 may then be adjusted until the camera 112 is at a desired position and orientation for capturing images of the moving component 102. Once in the desired position and orientation, the camera 112 may be secured in place. The depicted flexible member 114 includes one or more cables for transmission of imaging information from the camera 112.

Figure 2:
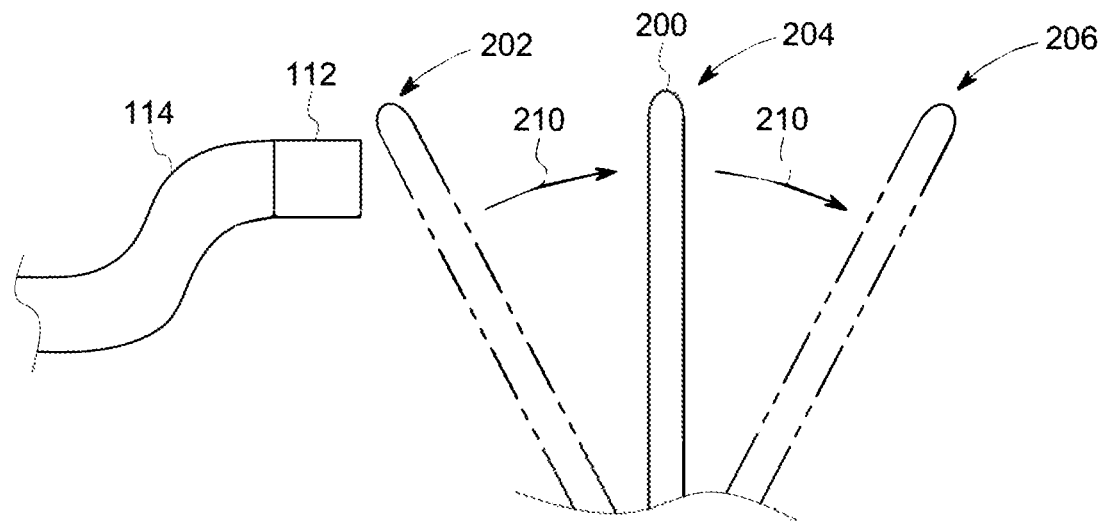
FIG. 2 is a schematic view of a system for inspecting rotating blades according to an embodiment.

It may be noted that the mounting location 116 may be associated with or part of the system 101 in some embodiments, or may be separate in other embodiments. For example, in some embodiments, the moving component 102 may include one or more blades of an aircraft, engine, and the mounting location 116 may be disposed on a wing of the aircraft. FIG. 2 provide a schematic view of inspection of a moving blade 200. As seen in FIG. 2, the camera 112 is positioned having a field of view through which the blade 200 passes as the blade rotates in direction 210. For example, a first frame may be acquired with the blade 200 at first position 202, a second frame acquired with the blade 200 at second position 204, and a third frame acquired with the blade 200 at third position 206. At the first position 202, the blade 200 may be too close to the camera 112 to be in focus, and, at the third position 206, the blade 200 may be too far from the camera 112 to be in focus. However, the blade 200 may be in focus at the second position 204. Accordingly, a frame acquired at second position 204 may be more useful for inspecting the blade 200 than frames acquired at the other positions.

Figure 3:
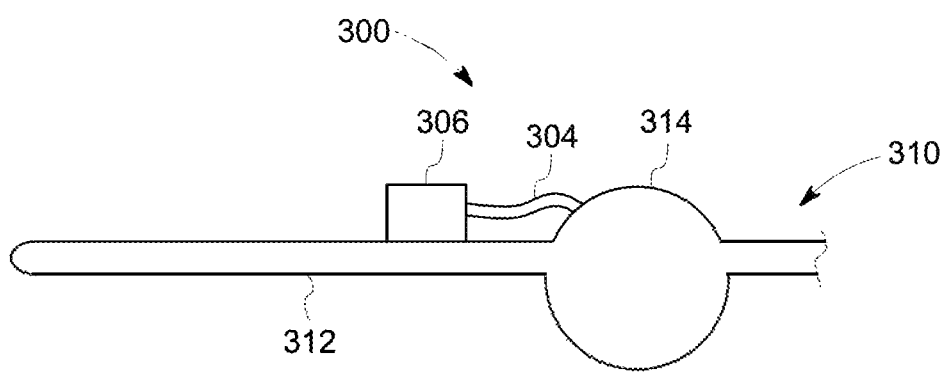
FIG. 3 is a schematic view of an on-wing inspection system according to an embodiment.

In some embodiments, the system 100 (or aspects thereof) may be configured to inspect a moving component while the moving component is installed in a desired target application. For example, the system 100 may be configured to mount on the wing of an aircraft, with the moving target 102 including one or more blades (e.g., blade 200) of an aircraft. FIG. 3 provides a schematic view of a system 300 (which may be generally similar in various respects to the system 100) mounted on a wing 312 of an aircraft 310. As seen in FIG. 3, the aircraft 310 includes an engine housing 314. The system 300 includes a flexible member 304 of a borescope with a camera at one end (not visible in FIG. 3) that is disposed within the engine housing 314 to inspect blades of the aircraft engine disposed within the engine housing 314. The system 300 also includes a base 306 that is configured to mount to the wing 312 of the aircraft. The base 306 may include therein one or more aspects of a processing unit (which may be generally similar in various respects to the processing unit 120). It may further be noted that the processing unit may be located off wing, with the base 306 configured to receive information from the camera disposed within the engine housing 314 via the flexible member 304, and to transmit the imaging information to the processing unit.

As discussed herein, and returning to FIG. 1, the borescope 110 acquires images of the moving component 102. For example, in the illustrated embodiment, the camera 112 acquires an acquisition series of frames of the moving component 102. In some embodiments, the acquisition series of frames may be acquired at a relatively high rate, for example 300 frames per second. However, even using a high rate of image acquisition, many of the acquired frames may have blurring sufficient to render the frames inappropriate for inspection purposes. Blurring may be caused by movement and/or focusing issues. For example, if the moving component 102 is moving quickly, and/or the system 101 is vibrating or shaking, motion may cause blurring. Additionally, blurring may result if the moving component 102 is outside of a focal range of the camera 112 at the time a particular frame is acquired. For example, the camera 112 may be in focus when the moving component 102 is at or near being positioned at a distance 105 from the camera 112. However, when the moving component 102 changes distance from the camera 112 (e.g., due to lateral and/or rotational movement relative to the camera 112) the moving component 102 may move out of a focus range corresponding to the distance 105, and blurring may result. For an object such as a blade rotating at a relatively high rate of speed as well as moving into and out of a focal range, a relatively large number of frames may be adversely affected by blurring. For example, for rotating blades of an aircraft engine, with 300 frames per second acquired, as many as 200 or more of the 300 may have too much blurring to be appropriate for inspection purposes.

Accordingly, in various embodiments, at least one processor is utilized to identify which frames have an allowable amount of blurring and to use those frames for inspection purposes, while discarding or otherwise not using frames having more than an allowable amount of blurring. In the illustrated embodiment, the processing unit 120 is operably coupled to the camera 112. For example, the processing unit 120 in the example depicted in FIG. 1 is coupled to a cable running through the flexible member 114 that transmits imaging information (e.g., acquired frames) from the camera 112 to the processing unit 120.

Generally, the depicted processing unit 120 acquires the acquisition series of frames from the camera 112, and determines a value for a blurriness metric for each of the frames. The processing unit 120 then selects frames that satisfy a threshold for the blurriness metric value to form an inspection series of frames, and performs an inspection analysis for the moving component 102 using the inspection series of frames. Accordingly, the inspection of the moving component is performed based on frames that have a tolerable amount of blurring, with those frames having more than a tolerable amount of blurring (as determined using one or more objective metrics quantifying or otherwise describing or depicting an amount of blurriness in each frame) not used for the inspection.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, FPGA's, ASIC's and/or computers, which may be integrated in a common housing or unit, or which may distributed among various units or housings (e.g., one or more aspects of the processing unit 120 may be disposed onboard a system having one or more components being tested, and one or more other aspects of the processing unit 120 may be disposed in a separate physical unit or housing). In the illustrated embodiment, the processing unit 120 includes a memory 122. Generally, the various aspects of the processing unit 120 act individually or cooperatively with other aspects to perform one or more aspects of the methods, steps, or processes discussed herein, for example to acquire and process images or frames of a video. Further, the process flows and/or flowcharts discussed herein (or aspects thereof) may represent one or more sets of instructions that are stored in the memory 122 for direction of operations of the system 100.

As discussed herein, the camera 112 acquires an acquisition series of frames of the moving component 102 as the moving component 102 moves through a volume proximate the camera 112. The moving component 102, for example, may be utilized in a manner corresponding to its use in practice, while the camera 112 acquires the acquisition series of frames. In some embodiments, the moving component 102 includes one or more blades of an aircraft engine that rotate about a shaft, with the camera 112 continuously acquiring the frames of the acquisition series at a constant rate over a predetermined amount of time. In the illustrated embodiment, the processing unit 120 acquires the acquisition series of frames from the camera 112 via a cable disposed inside the flexible member 114. In other embodiments, for example, the processing unit 120 may be disposed remotely from the borescope 110. For example, the camera 112 may be coupled to the processing unit 120 wirelessly, via a transmitting station coupled to a cable from the camera 112. After acquiring the acquisition series of frames, the processing unit 120 may begin a blurriness analysis immediately or nearly immediately, and/or may archive or store frames for future blurriness analysis. In some embodiments, the processing unit 120 may begin analyzing initial frames from the acquisition series for blurriness while subsequent frames of the acquisition series are acquired via the camera 112.

After frames are acquired, the processing unit 120 may examine the frames individually to determine whether or not each frame has an amount of blurriness that is satisfactory for use in inspecting the moving component 102. The frames, for example, may be examined or analyzed in chronological order based on the time of their acquisitions. Generally, the processing unit 120 applies one or more metrics that measure or quantify blurriness to determine a blurriness metric value for each of the frames. In some embodiments, the processing unit 120 determines a blurriness metric that is a composite or combination of different blurriness metrics. For example, the processing unit 120 may use a blurriness metric that is a sum of two or more metrics, or, as another example, a blurriness metric that is a weighted average of two or more metrics.

Various embodiments employ a baseline approach, which provides a quantitative value to describe the degree of blurriness in an image or frame of a video (or predetermined portion of an image or frame). Such an approach does not localize a particular place of blurriness or identify kinds or types of blurriness. For example, in some embodiments, the processing unit 120 uses a cumulative metric for an entire predetermined image area for each frame. The predetermined image area, for example, may be the entire frame. As another example, the predetermined image area may be a central portion of a frame, or other portion in which the moving component 102 to be inspected is expected to appear.

In some embodiments, a filter may be applied to the image (or predetermined portion of the image). For example, in various embodiments, the processing unit 120 is configured to generate a blurred frame for each acquired frame, compare the blurred frame to the corresponding acquired frame (e.g., compare variances of gradients of the respective frames), and determine the blurriness metric value based on a similarity between the blurred frame and the corresponding acquired frame. Generally, the more similar the acquired frame is to the blurred frame, the more blurry the acquired frame is judged, or the less similar the acquired frame is to the blurred frame, the less blurry the acquired frame is judged.

The filter applied to provide blurred frames corresponding to the acquired frames in various embodiments may be a set of generic blurriness filters learned from a set of known blurred images and non-blurred counterparts. The processing unit 120 may be configured to use one filter as a linear combination of such filters to generate the blurred frame for each acquired frame. For example, a learned filter F may be applied onto an image I, such that X=F(I), where I is an image or individual frame (e.g., of the acquisition series), F is the learned filter, or the blurriness kernel, configured to blur the image I, and X is a filtered image or blurred image corresponding to the image or frame I. With the blurred image corresponding to the image to be analyzed generated, the gradient of I and X are next determined. Because the filter F is known to blur the image, if the image I is of high quality (e.g., sharp or well defined borders between objects in the image), then the gradient of the filtered image will have a large difference relative to the gradient of the original, clear image. However, if the image I is of low quality or high blurriness (e.g., poorly defined borders between objects), then the gradient of the filtered image will be more similar to the gradient of the original image, as blurring an already blurred image will not change the original image as much. An evaluation value may then be determined based on the similarity or difference between the gradient of I and X. The evaluation value may be normalized to have a value between 0 and 1. For example, in some embodiments, a blurriness metric V may be defined as $V=1-\|gradient(I)-gradient(X)\|/\|gradient(I)\|$, where $\|.\|$ may be an L2-norm, an L1-norm, or any well-defined norm operator. A norm operator may be used to convert the measured vector to a scalar value. The value of V is bounded between 0 and 1 from its mathematical formulation. If the image I is clear, the value V will be lower or closer to 0, but if the image I is blurry, the value V will be higher or closer to 1, depending on the degree of blurriness.

As another example, the processing unit 120 in various embodiments is configured to determine the blurriness metric value using a library of reference images including corresponding blurred portions. For example, the processing unit 120 may utilize deep learning or artificial intelligence training utilizing reference images with known blurred portions to determine or identify probabilities of blurring in images or frames being analyzed. It may be noted that such an approach may enable the processing unit 120 to identify not just the presence of blurring, but also to identify types of blurring, degrees or amount of blurring, or particular areas or locations of blurring within frames or images. Accordingly, in various embodiments, the processing unit 120 may determine the blurriness metric value based on one or more of a type of blur, a degree of blurring, or an area of blurriness. In determining the blurriness metric value, the processing unit 120 may emphasize or more heavily weight particular types of blurring and/or particular locations of blurring, for example. For instance, if a type of blurring, or a location of blurring, is known to be particularly problematic for performing an inspection, that type or location of blurring may be weighted more heavily when combining with other examples of blurring in the frame or image.

With the blurriness metric value determined, the processing unit 120 next selects frames that satisfy a threshold for the blurriness metric value to form an inspection series of frames. Those frames from the acquisition series that satisfy the threshold are included in the inspection series, while those frames that do not satisfy the threshold are discarded or otherwise excluded. The particular threshold used in a given application may be set based on the image quality requirements for that particular application. For example, for an application where frames will be automatically or autonomously inspected, the automatic or autonomous inspection may require a given image quality (e.g., level of clarity) to help identify particular types of defects and/or to eliminate or reduce false positives for defects. Accordingly, the threshold may be set based on a blurriness metric value that achieves the image quality desired for the automatic or autonomous inspection. In various embodiments, based on a number of frames desired for a particular inspection process, a target number of frames may be acquired. For example, the frames may be analyzed for blurriness as they are acquired, and the acquisition series of frames may be acquired until a desired number of acceptable frames have been identified using the threshold. As another example, the acquisition series may be acquired over a period of time identified to be sufficient to provide a desired number of frames having acceptable clarity for use in inspection of the moving component 102.

Next, with the inspection series of frames generated from the acquisition series using the blurriness metric value, the processing unit 120 performs an inspection analysis for the moving component 102 using the inspection series of frames. Generally, the inspection analysis is performed to identify or determine the presence (or absence) of defects in the moving component 102 being identified. For example, in various embodiments, based on the number, type, and/or severity of defects found in the inspection analysis, the moving component 102 is determined to pass or fail the inspection. In some embodiments, the processing unit 120 may perform the inspection analysis autonomously or automatically. For example, the processing unit 120 may be programmed or configured to compare the imaged moving component 102 in acceptable frames to known components that satisfy inspection requirements (and/or known components that do not satisfy inspection requirements) to determine if the moving component 102 passes inspection. It may be noted that, in some embodiments, the processing unit 120 may perform the inspection analysis at or near the time of the identification of the inspection series of frames, while, in other embodiments, the inspection may be performed at a later time. For example, one processor located at a first location may identify the inspection series of frames, and provide the inspection series to another processor located at a second location that performs the inspection analysis at a second, later time. For components that are found to not satisfy inspection requirements, a remedial or follow-up task may be performed, such as further inspection to confirm the defect, replacement of a defective component, or repair of a defective component.

As discussed herein, various embodiments allow for inspection of a moving part or component that is in place on a system with which it is configured to operate. As such, time is saved by not having to remove the part or component. Further, the component may be inspected while performing an intended function.

Figure 4:
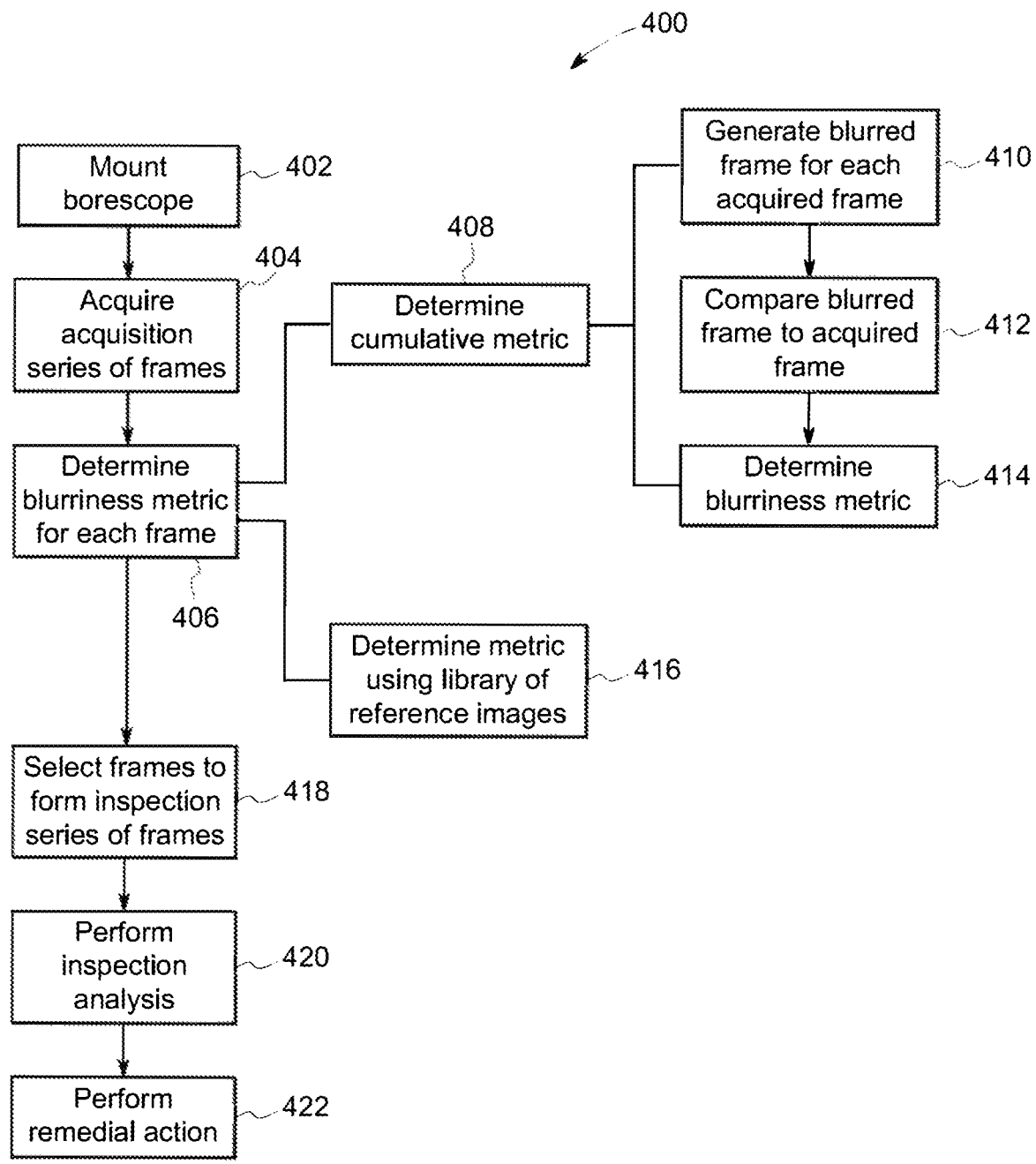
FIG. 4 provides a flowchart of a method according to an embodiment.

FIG. 4 provides a flowchart of a method 400 in accordance with various embodiments. The method 400 (or aspects thereof), for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware (e.g., one or more aspects of the processing unit 120) to perform one or more operations described herein.

At 402, a borescope (e.g., borescope 110) is mounted on a wing of an aircraft. The borescope in various embodiments includes a camera disposed at an end of a flexible member, with the flexible member manipulated to place the camera in a desired location and at a desired orientation to acquire images of a moving part (e.g., moving component 102). For example, with the borescope mounted on the wing of an aircraft, one or more moving blades of an aircraft engine may be inspected, without having to remove the engine or the blades from the aircraft. It may be noted that other types of moving components may be imaged in other embodiments.

At 404, an acquisition series of frames of at least one target component (e.g., a moving target such as a moving blade of an aircraft engine) is acquired with a borescope. As the acquisition series of frames is acquired, the target moving component(s) may move into and out of a focus range of the camera of the borescope, resulting in blurriness caused by the target being out of focus. Blurriness may also be caused in some of the frames by motion.

At 406, a blurriness metric is determined for each of the frames using at least one processor (e.g., processing unit 120). Various techniques may be employed for determining the blurriness metric (which may in some embodiments be a composite or combination of separately determined blurriness metrics). For example, in the illustrated embodiment, at 408, a cumulative metric for an entire predetermined image area is used to determine a blurriness metric for each frame. The predetermined image area may be a portion (e.g., a central portion) of the frame, or, as another example, may be an entire frame. A filter may be used in connection with determining the cumulative metric. For example, at 410 of the illustrated embodiment, a blurred frame is generated for each acquired frame. At 412, the blurred frame is compared to the corresponding acquired frame. For example, the gradient of the blurred frame and the gradient of corresponding acquired frame used to generate the blurred frame may be compared. At 414, the blurriness metric value is determined based on a similarity between the blurred frame and the corresponding acquired frame (e.g., based on a similarity between the gradient of the blurred frame and the gradient of the corresponding acquired frame).

As another example, at 416, the blurriness metric is determined using a library of reference images including corresponding blurred portions. Such an approach may use one or more processor trained via deep learning or artificial intelligence suing reference images with known blurred portions. The metric may be determined based on a probability of blurring determined based on the training using the reference images. Further, the blurriness metric may be based on and/or identify one or more of a type of blurring, a degree of blurring, or an area of blurriness.

At 418, frames are selected from the acquisition series of frames to form an inspection series of frames. The frames in various embodiments are selected based on a threshold for the blurriness metric value determined at 406. For example, those frames that have a determined blurriness metric value that satisfies the threshold are selected for inclusion in the inspection series of frames, while those frames that do not are not included in the inspection series.

At 420, an inspection analysis is performed for the at least one target component (e.g., moving target component). The inspection analysis is performed using the inspection series of frames. Accordingly, a more reliable result may be obtained, and/or the result obtained more efficiently, than if the entire acquisition series (which may include a relatively large number of frames with substantial blurring) were used. Generally, the inspection analysis is performed to look for defects and to determine if the component is acceptable or not. The inspection analysis may be performed autonomously or automatically, for example, with one or more processors configured to identify defects of a target component in image frames using one or more analytic algorithms.

At 422 of the illustrated embodiment, a remedial action is performed for any target components found not to be acceptable. For example, a follow-up or more thorough inspection may be performed to confirm the inspection result, or to provide more detail into any detected defects to help determine subsequent remedial actions. As another example, a component may be replaced as a result of the inspection analysis. As another example, a component may be repaired as a result of the inspection analysis.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
   a borescope including a camera configured to acquire an acquisition series of frames of at least one target component; and
   at least one processor operably coupled to the camera, the at least one processor configured to:
   acquire the acquisition series of frames from the camera;
   determine a blurriness metric value for each of the frames using reference images including known corresponding blurred portions, wherein the at least one processor is configured to determine the blurriness metric value using a weighting based on at least one of type or location of blurring;
   select frames that satisfy a threshold for the blurriness metric value to form an inspection series of frames; and
   perform an inspection analysis for the at least one target component using the inspection series of frames.

2. The system of claim 1, wherein the system is mounted on a wing of an aircraft, and the at least one target component includes blades of an aircraft engine.

3. The system of claim 1, wherein the at least one processor is configured to use a cumulative metric for an entire predetermined image area for each frame.

4. The system of claim 3, wherein the at least one processor is configured to generate a blurred frame for each acquired frame, compare the blurred frame to the corresponding acquired frame, and determine the blurriness metric value based on a similarity between the blurred frame and the corresponding acquired frame.

5. The system of claim 4, wherein the at least one processor is configured to use a linear combination of blurriness filters to generate the blurred frame for each acquired frame.

6. The system of claim 1, wherein the blurriness metric value is based on a degree of blurring.

7. A method comprising:
   acquiring, with a borescope including a camera, an acquisition series of frames of at least one target component;
   determining, with at least one processor, a blurriness metric value for each of the frames using reference images including known corresponding blurred portions, wherein determining the blurriness metric value includes using a weighting based on at least one of type or location of blurring;
   selecting frames that satisfy a threshold for the blurriness metric value to form an inspection series of frames; and
   performing an inspection analysis for the at least one target component using the inspection series of frames.

8. The method of claim 7, wherein the at least one target component includes blades of an aircraft engine.

9. The method of claim 8, further comprising mounting the borescope on a wing of an aircraft.

10. The method of claim 7, further comprising using a cumulative metric for an entire predetermined image area for each frame.

11. The method of claim 10, further comprising generating a blurred frame for each acquired frame, comparing the blurred frame to the corresponding acquired frame, and determining the blurriness metric value based on a similarity between the blurred frame and the corresponding acquired frame.

12. The method of claim 11, further comprising using a linear combination of blurriness filters to generate the blurred frame for each acquired frame.

13. The method of claim 7, wherein the blurriness metric value is based on a degree of blurring.

14. A tangible and non-transitory computer readable medium comprising one or more computer software modules configured to direct one or more processors to:
   acquire, with a borescope including a camera, an acquisition series of frames of at least one target component;
   determine a blurriness metric value for each of the frames using reference images including known corresponding blurred portions, wherein the one or more computer software modules are further configured to direct the one or more processors to determine the blurriness metric value using a weighting based on at least one of type or location of blurring;
   select frames that satisfy a threshold for the blurriness metric value to form an inspection series of frames; and
   perform an inspection analysis for the at least one target component using the inspection series of frames.

15. The tangible and non-transitory computer readable medium of claim 14, wherein the one or more computer software modules are further configured to direct the one or more processors to use a cumulative metric for an entire predetermined image area for each frame.

16. The tangible and non-transitory computer readable medium of claim 15, wherein the one or more computer software modules are further configured to direct the one or more processors to generate a blurred frame for each acquired frame, compare the blurred frame to the corresponding acquired frame, and determine the blurriness metric value based on a similarity between the blurred frame and the corresponding acquired frame.

17. The tangible and non-transitory computer readable medium of claim 14, wherein the one or more computer software modules are further configured to direct the one or more processors to determine the blurriness metric value based on a degree of blurring.

18. The system of claim 1, wherein the at least one processor is configured to acquire the acquisition series of frames until a desired number of acceptable frames have been identified using the threshold.

19. The method of claim 7, comprising acquiring the acquisition series of frames until a desired number of acceptable frames have been identified using the threshold.

20. The tangible and non-transitory computer readable medium of claim 14, wherein the one or more computer software modules are further configured to direct the one or more processors to acquire the acquisition series of frames until a desired number of acceptable frames have been identified using the threshold.

\* \* \* \* \*